June 4, 1957     M. R. BUCHANAN     2,794,248
LAWN EDGER
Filed Jan. 17, 1957     2 Sheets-Sheet 1

Moses R. Buchanan
INVENTOR.

June 4, 1957  M. R. BUCHANAN  2,794,248
LAWN EDGER

Filed Jan. 17, 1957  2 Sheets-Sheet 2

Moses R. Buchanan
INVENTOR.

000# United States Patent Office 2,794,248
Patented June 4, 1957

2,794,248
LAWN EDGER

Moses R. Buchanan, Albuquerque, N. Mex.

Application January 17, 1957, Serial No. 634,784

4 Claims. (Cl. 30—206)

My invention relates to improvements in lawn edgers for trimming grass along the edges of walks and curbs which cannot be cut by lawnmowers.

The primary object of my invention is to provide a lawn edger for carrying by hand along and over the edges of walks and curbs and which embodies motor driven shearing means especially adapted for shearing grass and the like close to such walks and curbs.

Another object is to provide a lawn edger for the above purposes which is light in weight for easy carrying yet strong and durable, safe to use not liable to become damaged by hard objects in the lawn, and is simple in construction and inexpensive to manufacture and service.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is an exploded view in perspective of parts of the shearing and drive means.

Figure 1:
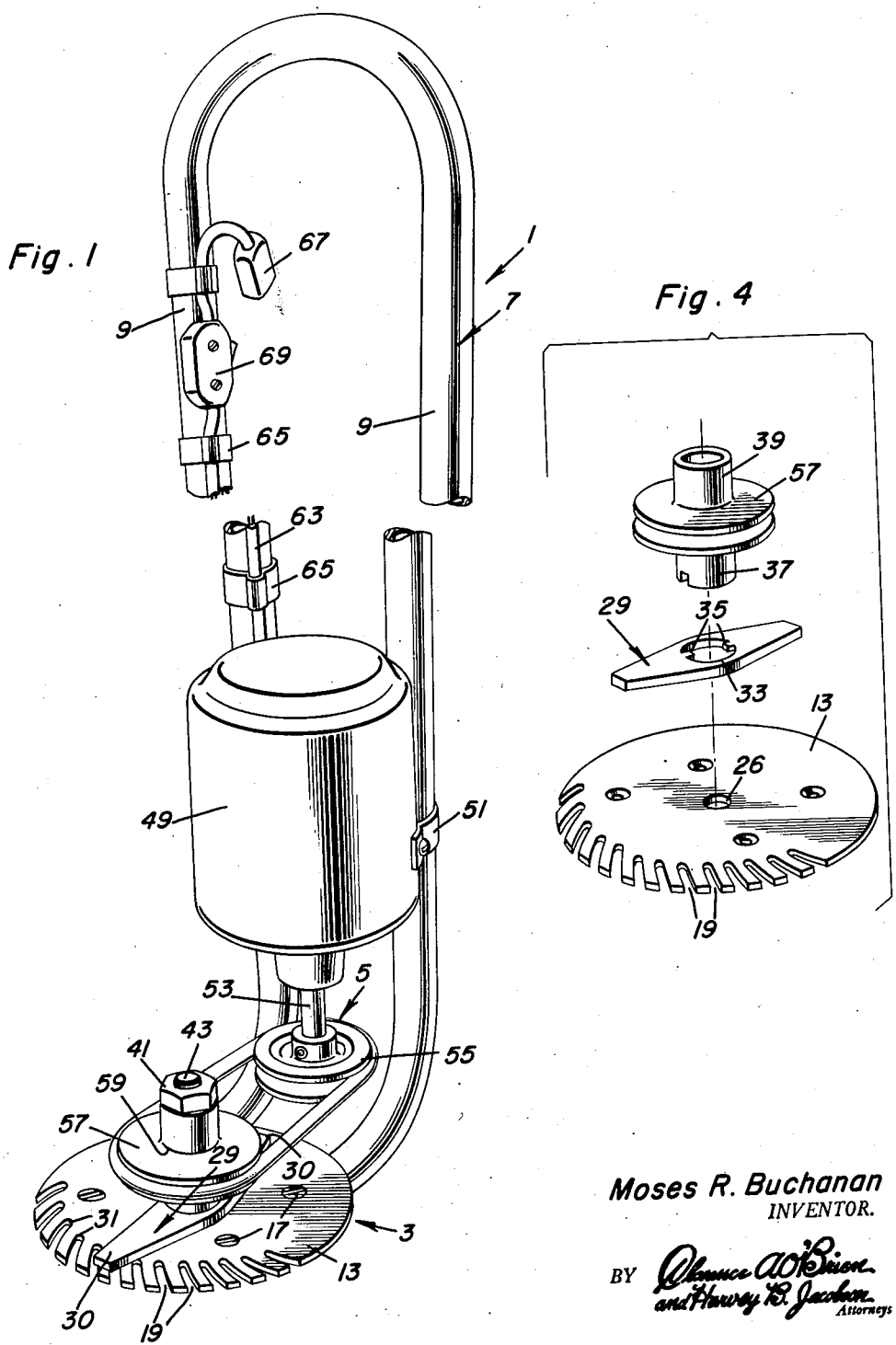
Figure 1 is a view in perspective, partly broken away of my improved lawn edger in the preferred embodiment thereof.
Figure 2:
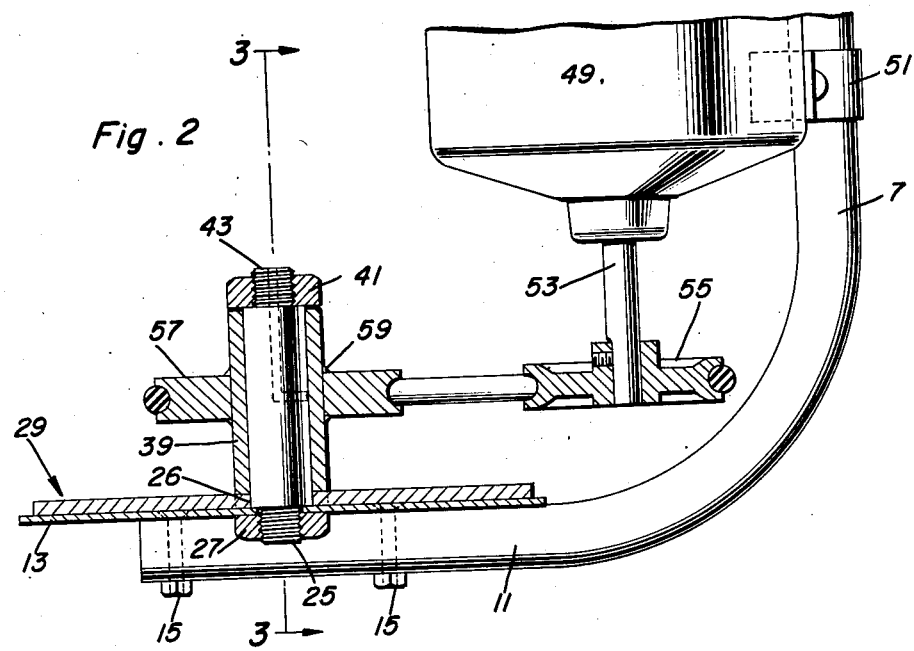
Figure 2 is an enlarged fragmentary view partly in side elevation and partly in vertical section of the same.
Figure 3:
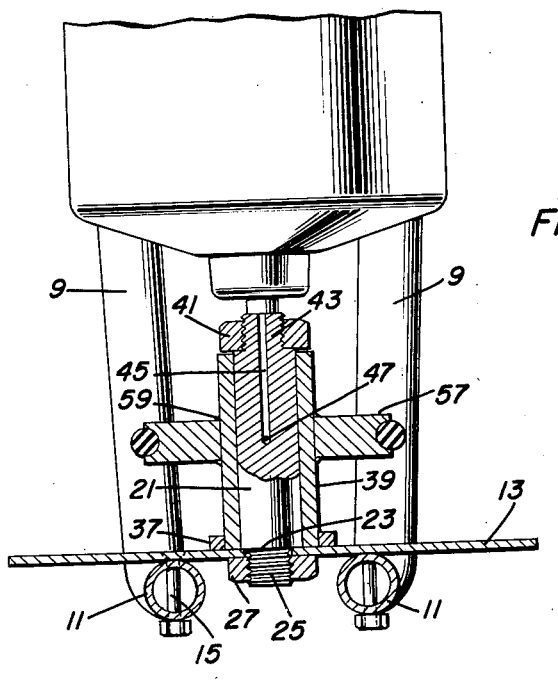
Figure 3 is a fragmentary view in vertical section taken on the line 3—3 of Figure 2.

Referring to the drawings by numerals, the lawn edger of my invention comprises a carrying frame designated generally by the numeral 1, for shearing means 3, and a motor drive 5 for the shearing means 3.

The frame 1 includes a single length of metal tubing bent upon itself to form a vertically elongated handle 7 of inverted U-shape with a pair of downwardly converging side legs 9 for grasping by the hands and which terminate in lower forwardly bent and laterally spaced feet 11 at right angles to said sides and for supporting the shearing means 3.

The shearing means 3 comprises a grass gathering disk 13 supported on said feet 11 by screw bolts 15 having heads 17 countersunk in the top of the disk 13 and is provided forwardly of said ends 11, with a front arcuate series of circumferentially spaced grass gathering notches 19 therein of elongated form.

An axial stud 21 rises from the gathering disk 13 and is provided with a lower shoulder 23 seated on said disk 13 and a lower reduced end 25 extending through an axial opening 26 in said disk and provided with a nut 27 thereon below said disk and whereby the stud 21 is clamped to said disk.

A shearing blade 29 is mounted on the stud 23, as presently described, diametrically thereof to rotate thereon with its ends 30 revolving across the notches 19 toward the bottom 31 of said notches to shear grass projecting through the notches against one side of said notches. The shearing blade 29 is provided with an axial circular opening 33 having diametrical key lugs 35 therein and by means of which it is keyed on the lower notched end 37 of a tubular bushing 39 journaled on the stud 21 and rotatably seated on the disk 13. A nut 41 on a reduced upper end 43 of the stud 21 secures the bushing 39 on said stud. An axial and a lateral lubricating duct 45, 47 for the bushing 39 and shearing blade 29 are provided in said stud. As will be noted the disk 13 is centered between the feet 11 and extends forwardly therefrom.

The motor drive 5 drives the shearing blade 39 and includes the bushing 39, an electric motor 49 and a belt and pulley connection from the motor 49 to the bushing 39. The motor 49 is mounted by brackets 51 on the legs 9 in front thereof and behind and above the disk 13 with its armature shaft 53 vertical and depending therefrom. The belt and pulley connection comprises a pulley 55 on the lower end of the armature shaft, a pulley 57 surrounding and welded, as at 59 to the bushing 39 and a belt connecting said pulleys 55, 57. A lead cable 63 to the motor 49 is secured by clips 65 to one leg 9 with a terminal motor control switch 67, and a socket member 69 interposed thereon for plug in connection to an electric power line not shown.

In using the described lawn edger it is carried by the frame 1 with said frame upright and manipulated to move the disk horizontally along an edge of a walk or curb so that grass will be gathered in the slots 19 to be sheared off close to the disk as the rotary shearing blade 29 passes over the bottoms 31 of the notches 19 and the sides thereof confronting the ends 30 of said blade 29. In this connection it is to be noted that because of the tangential arrangement of the notches 19 the confronting sides thereof cross the ends of the blade at an angle thereto such that the ends of the blade force grass in said notches toward the bottoms 31 of the notches so that said blade and notches coact to shear with a draw cut.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lawn edger comprising a vertically elongated frame of inverted U-shape forming a pair of side legs for grasping by both hands to carry and manipulate the frame, said legs terminating in a pair of laterally spaced horizontal feet, a horizontal disk secured and centered on said pair of feet for moving horizontally along an edge of a lawn, a series of circumferentially spaced elongated edge notches in said disk for gathering grass therein, an elongated shearing blade extending diametrically over said disk, means mounting said blade centrally in the axis of the disk for rotation of its ends over said notches to coact with one side thereof in shearing grass in said notches, said means including a vertical rotary bushing on which said blade is fixed, a motor mounted on said legs above said blade, and operating connections between said motor and bushing.

2. The combination of claim 1, said notches being formed in said disk to cross said ends of the blade obliquely for effecting a draw cut in shearing grass.

3. The combination of claim 1, said means further including an axial stud rising from said disk and fixed thereto and on which said bushing is journaled.

4. The combination of claim 1, said operating connections comprising a pulley fixed on said bushing and a belt and pulley drive from the motor to said first named pulley.

No references cited.